United States Patent [19]

Carlson et al.

[11] Patent Number: 4,478,322
[45] Date of Patent: Oct. 23, 1984

[54] LOCKUP CLUTCH CONTROL SYSTEM

[75] Inventors: David K. Carlson, Dearborn; William G. Burnia; William J. Haley, both of Sterling Heights, all of Mich.

[73] Assignee: Borg-Warner Corporation, Chicago, Ill.

[21] Appl. No.: 257,292

[22] Filed: Apr. 24, 1981

[51] Int. Cl.³ .............................................. B60K 41/28
[52] U.S. Cl. .............................. 192/0.055; 192/0.094; 192/3.31
[58] Field of Search ...................... 192/3.31, 3.58, 3.57, 192/4 A, 0.033, 0.076, 0.082, 0.094, 3.23, 3.3, 3.29, 3.28, 0.055

[56] References Cited

U.S. PATENT DOCUMENTS

| | | | |
|---|---|---|---|
| 3,232,399 | 2/1966 | Harned et al. | 192/103 R |
| 3,446,320 | 5/1969 | Schott | 192/4 A |
| 3,566,998 | 3/1971 | Honda | 192/3.31 X |
| 3,599,764 | 8/1971 | Darmstadt et al. | 192/103 R |
| 4,056,177 | 11/1977 | Ahlen et al. | 192/3.31 X |
| 4,223,829 | 9/1980 | Bange | 192/113 B |
| 4,257,503 | 3/1981 | Lutnick | 192/3.23 |
| 4,282,947 | 8/1981 | Kemper | 192/0.033 X |
| 4,388,987 | 6/1983 | Hennessey et al. | 192/3.31 X |

Primary Examiner—George H. Krizmanich
Attorney, Agent, or Firm—James J. Jennings

[57] ABSTRACT

An electronic control system for a lockup clutch includes a control system for receiving a vehicle speed signal and, as a function of adjustable engagement and release threshold signals, controlling a solenoid valve to engage and release a lockup clutch. The point of lockup is set by a potentiometer to represent a first vehicle speed, and the point of release is set by a variable resistor at a second speed, lower than the first. The variable resistor is switched into the circuit only after the first threshold level is passed and the clutch is locked up. A signal from the brake pedal overrides the threshold established in the control system to provide clutch disengagement as soon as the brake pedal is depressed. Various circuit components protect the control system from inadvertent damage by the driver and/or vehicle maintenance personnel.

13 Claims, 3 Drawing Figures

LOCKUP CLUTCH CONTROL SYSTEM

BACKGROUND OF THE INVENTION

In the field of vehicle propulsion, where drive torque is transferred from an engine through a transmission to the vehicle driven wheels, it has become generally known that a hydrodynamic device can be employed. Such a device is generally positioned between the engine and the transmission, and "softens" the transient spikes of high torque or high speed engine shaft movement, preventing an unpleasant sensation from being translated to the driver. If the hydrodynamic device is a torque converter, then the engine output torque can also be multiplied to assist in accelerating the vehicle from a standing start, or from a low speed to a higher speed.

When fluid couplings and torque converters were employed, it also became known to provide a lockup clutch for mechanically locking the input member of the hydrodynamic device to the output member. By controlling the clutch to effect such lockup after the vehicle has attained a predetermined, low speed such as 10 miles per hour (mph), considerable savings can be realized by obviating the spin losses in the coupling itself. This technology was given fresh importance in 1973, when the price of crude oil began to climb rapidly. Different types of lockup clutches were employed, but there still remain several shortcomings of such clutches.

One such disadvantage of known devices is that the output shaft speed was generally sensed by taking a signal from the governor valve fluid line. For some purposes this may be adequate but it does not provide a convenient, accurate reference for regulating the precise point of clutch lockup, and the exact time of clutch release. In addition, it has been difficult to obtain precise control in the region encompassing the lockup and release points of the clutch. It is thus a primary consideration of the present invention to produce an improved control system which achieves more effective control and does not utilize the governor line as a speed-indicating signal.

When the transmission used with a fluid coupling or torque converter is a continuously variable transmission (CVT), this leads to an additional difficulty. When the adjustable pulleys are in the overdrive condition and the vehicle is moving at a normal speed, if the brake pedal is sharply depressed in a "panic stop" mode, the vehicle may be rapidly halted before the CVT pulleys are shifted to the overdrive position, to obtain maximum torque at the next start-up. If a metal belt is used with metal pulleys in a CVT, this can result in damage to the belt as the CVT is forced into the underdrive position after the vehicle has stopped. It is thus another important consideration of the present invention to provide a control system which virtually assures the CVT will be returned to the overdrive ratio position before the vehicle is halted, even in a panic stop condition.

SUMMARY OF THE INVENTION

A control system constructed in accordance with the present invention regulates energization and deenergization of a lockup clutch for a hydrodynamic device, whether a fluid coupling or a torque converter. A lockup control valve is provided to regulate passage of fluid to and from the lockup clutch, to regulate the energization and deenergization of the clutch.

The control system of the present invention is connected to provide an output signal for controlling the lockup clutch. The control system operates to provide this output signal upon a determination that an input signal, representing the vehicle speed, exceeds a predetermined threshold value. A suitable pickup means, such as a magnetic pickup driven by the speedometer gear or some other vehicle speed-denoting drive, provides the requisite input signal to the control system.

In accordance with an important aspect of the invention, the control system includes a "dead band" or hysteresis level which precludes inaccurate or erratic operation adjacent the clutch closure and release points.

In accordance with another important aspect of the invention, the control system overrides normal operation when the brake pedal of the vehicle is depressed.

THE DRAWINGS

In the several figures of the drawings, like reference numerals identify like components, and in those drawings.

DETAILED DESCRIPTION OF THE INVENTION

Figure 1:
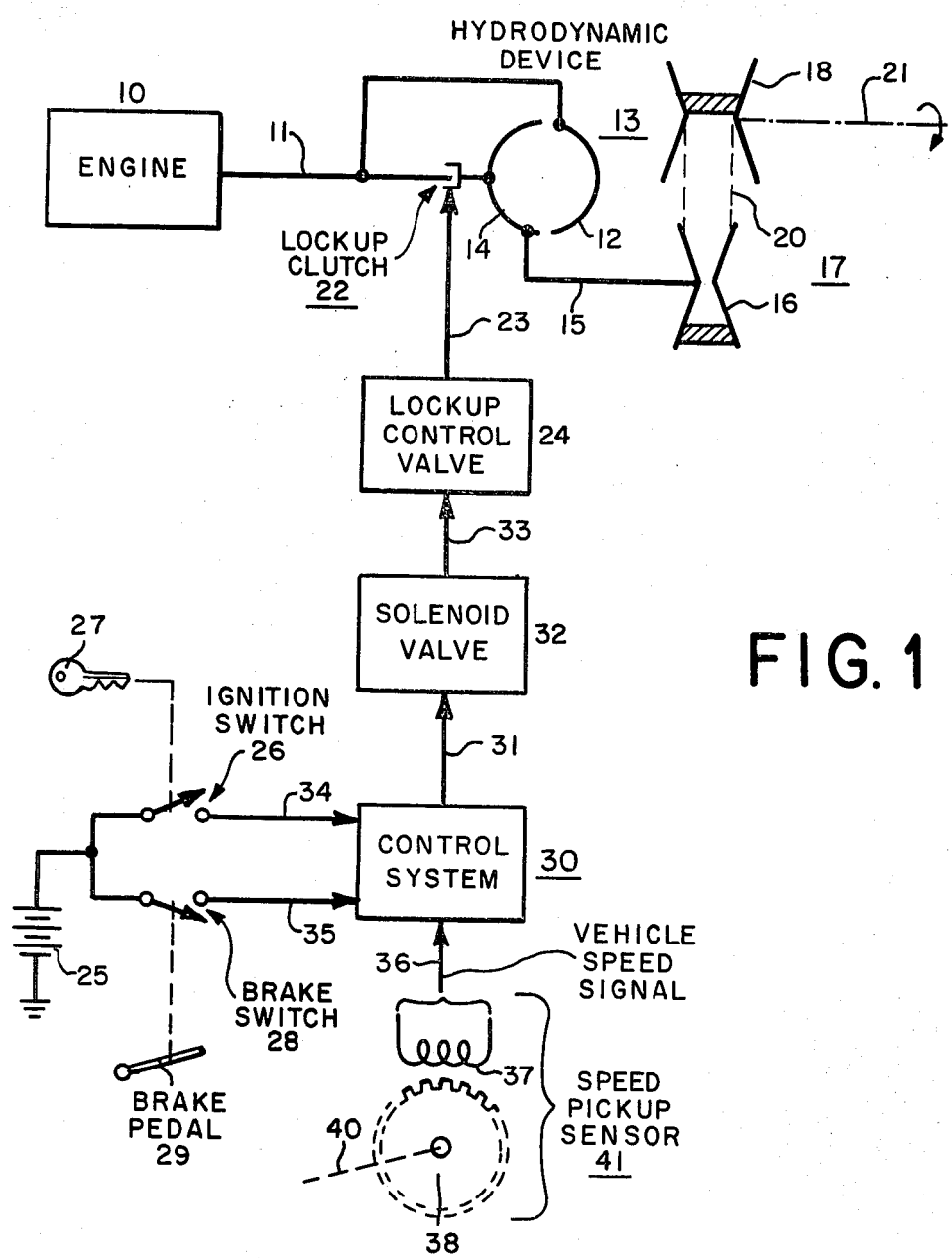
FIG. 1 is a block diagram depicting the general signal path of a control system associated with a lockup clutch arrangement.

FIG. 1 depicts conventional vehicle components found in the drive train, and also the components of the present invention. An engine 10 drives an engine output shaft 11, which is coupled to the impeller 12 of a hydrodynamic device 13. Although shown as a fluid coupling, a torque converter can also be used without departing from the principles of this invention. The hydrodynamic device has an output member or turbine 14 coupled over a shaft 15 to an input pulley 16 of a continuously variable transmission 17. The transmission has an output pulley 18 coupled over a belt 20 to input pulley 16, and the output pulley is also coupled to an output shaft 21 for transferring drive torque to the vehicle wheels (not shown). The system for regulating the ratio between pulleys 16, 18 is not depicted because such a CVT arrangement and its attendant control system are now well known and understood.

A lockup clutch 22 is shown between engine output shaft 11 and turbine 14. When clutch 22 receives a fluid signal through line 23 from lockup clutch control valve 24, the shaft 11 is locked to turbine 14 so that there is a solid mechanical link between shafts 11 and 15, without any fluid losses in hydrodynamic device 13. Other conventional components associated with the vehicle are the battery 25 for providing electrical energy, an ignition switch 26 for actuation when a key 27 is inserted and rotated, and a brake switch 28 closed by operation of a brake pedal 29.

A major component of the present invention is an electrical control system 30, connected to provide an output electrical signal over line 31 to the winding of a solenoid valve 32. When actuated, valve 32 provides a fluid signal through line 33 to regulate operation of lockup control valve 24. For purposes of this explanation and the appended claims, valves 24 and 32 can be considered as means for controlling energization and deenergization of clutch 22 as a function of the output signal provided by control system 30.

Control system 30 receives its energization over line 34 from vehicle battery 25 when ignition switch 26 is closed. Control system 30 also receives a "brake-on" signal over line 35 when brake pedal 29 is depressed to close brake switch 28.

Control system 30 also receives another input signal over line 36, representing the vehicle speed. This signal is derived from winding 37 as the individual teeth on a gear or toothed wheel 38 pass adjacent winding 37. Toothed wheel 38 can be an independent wheel driven, over the connection represented by broken line 40, from the speedometer gear or any other component of the vehicle which provides an accurate indication of the vehicle speed. Those skilled in the art will understand that unit 38 need not be a separate wheel or gear, but in some instances winding 37 can pick up a signal from a gear or moving part already present in the vehicle. Thus control system 30, the major component of the inventive system, cooperates with solenoid valve 32 and speed pickup sensor assembly 41 to achieve improved control of lockup clutch 22. With this broad perspective, a more detailed description of control system 30 will now be set out.

Figure 2:
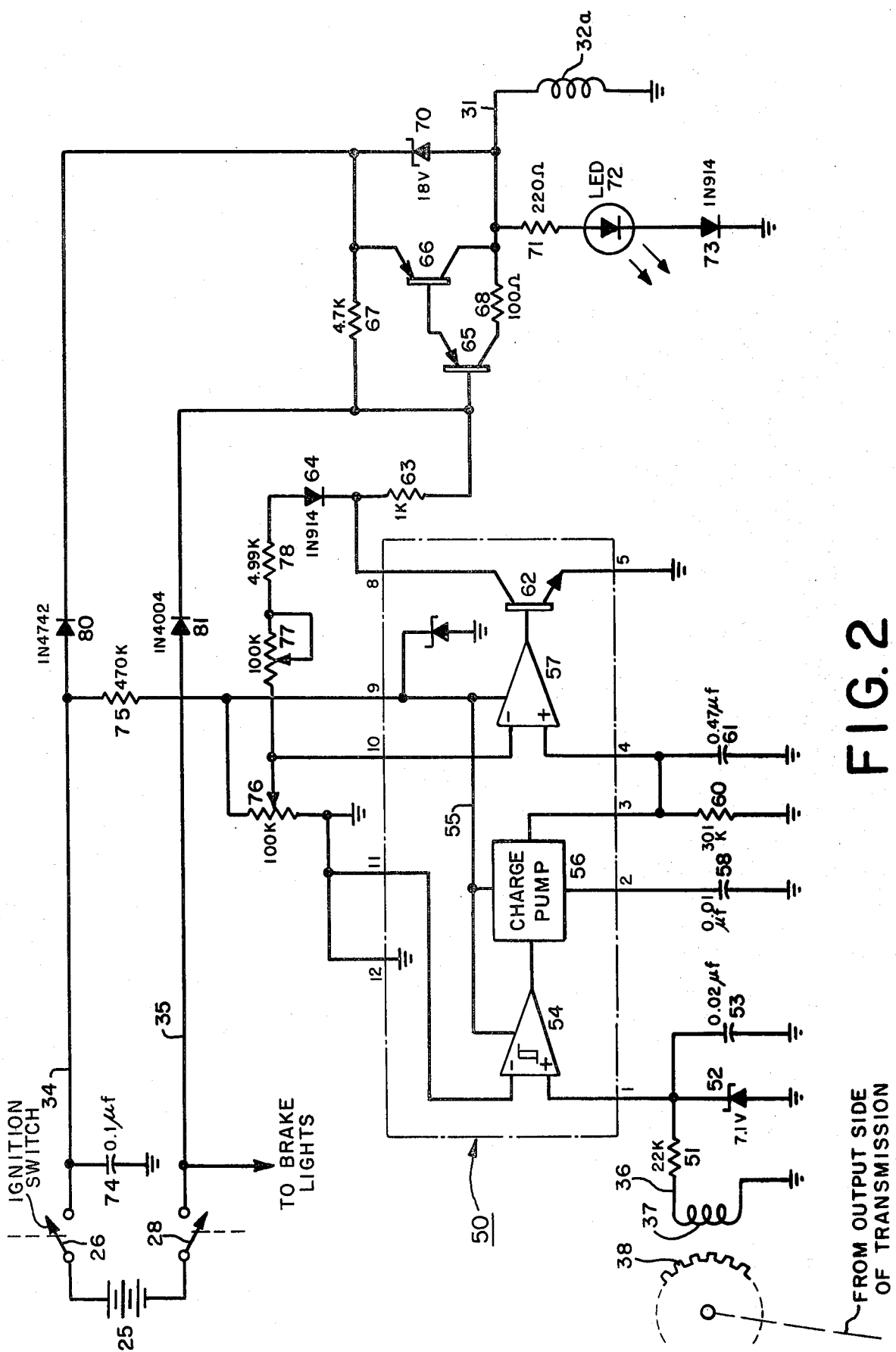
FIG. 2 is a schematic diagram illustrating electrical circuit details of the control system shown more generally in FIG. 1.

FIG. 2 illustrates circuit details of the control system 30. A large part of the electronic system is included in an integrated circuit chip 50, which in the preferred embodiment was an LM2917, available from National Semiconductor. This standard chip has 14 pin connections, but pins 6, 7, 13 and 14 were not used in the embodiment shown. The other pin numbers are shown adjacent the respective connections to the components on the chip.

Toothed wheel 38 in the embodiment shown was a 46 tooth gear driven from the output side of transmission 17. This provides an alternating signal on line 36, for passage over a resistor 51 to the pin 1 connection of the integrated circuit (ic). A Zener diode 52 is connected between pin 1 and ground and a ceramic disc capacitor 53 is coupled in parallel with diode 52.

A Schmitt trigger 54 within the chip has its plus connection coupled to pin 1, and its minus connection coupled to pin 11. Another connection from Schmitt trigger 54 is made over conductor 55 in the chip to charge pump stage 56 and op amp 57. Another capacitor 58 is coupled to pin 2 of the op amp and, over this connection, to charge pump 56. The output of the charge pump stage is coupled over pin 3 to a resistor 60, and to the top of a capacitor 61 which is also coupled through pin 4 to the plus input of op amp 57. The output side of op amp 57 is coupled to the base of an NPN type transistor 62, of which the emitter is connected through pin 5 to ground. The collector of transistor 62 is coupled through pin 8 to the common connection between a resistor 63 and the cathode of a diode 64. The other end of resistor 63 is coupled to the base of a first PNP type transistor 65, the emitter of which is coupled to the base of a second PNP type transistor 66. These two transistors are connected in a Darlington configuration. A resistor 67 is coupled between the base of transistor 65 and the emitter of transistor 66, and another resistor 68 is coupled between the collectors of transistors 65, 66. Another Zener diode 70 is coupled in parallel with the second transistor 66. A series circuit including a resistor 71, a light-emitting diode (led) 72, and a standard diode 73 is coupled between the collector of transistor 66 and ground. Collector 66 is also coupled over conductor 31 to winding 32a of the solenoid valve.

A capacitor 74 is coupled between ignition input line 34 and ground, and a resistor 75 is coupled between line 34 and both pin 9 of the ic and one end of a potentiometer 76. The other end of potentiometer 76 is connected to a circuit ground, through pin 11 to the minus input of Schmitt trigger 54, and through pin 12 to a ground on the chip 50. The wiper of potentiometer 76 is connected through pin 10 to the inverting input of op amp 57 and is also connected through a variable resistor 77, a fixed resistor 78 and diode 64 to the junction of resistor 63 and the collector of output transistor 62 on the chip.

Ignition line 34 is also connected to the anode of another diode 80, the cathode of which is coupled to the cathode of Zener diode 70, to the emitter of transistor 66, and to one end of resistor 67. Brake line 35 is coupled to the anode of another diode 81, the cathode of which is coupled to the common connection of resistor 67, the base of transistor 65, and resistor 63.

The operation of the control system shown in FIG. 2 is as follows. The speed-related input signal is developed at pin 1 of the ic. While a wheel with 46 teeth was utilized as member 38 in the embodiment of the invention built and tested, those skilled in the art will appreciate other transducers such as optoelectronic, capacitive, Hall effect, and other devices can be employed to produce a signal on line 36 related to the vehicle speed. Zener diode 52 protects the integrated circuit from damage by transients appearing on input line 36. Resistor 51 and capacitor 53 together form a low-pass filter, which shorts out high frequency signals and noises. The signal developed across winding 37 goes above and below ground, but when it goes below ground, it is limited by the diode voltage drop of diode 52. Accordingly the signal developed at pin 1 of the ic and passed to the Schmitt trigger stage 54 is a truncated sine wave. The other input of the Schmitt trigger is grounded. Hence, any time the signal at pin 1 goes above this ground or reference level by a certain amplitude, about 50 millivolts in the illustrated embodiment, the Schmitt trigger switches. In turn this regulates operation of charge pump stage 56, which "pumps" current out over the connection designated pin 3 to capacitor 61. The voltage across capacitor 61 approaches a level approximately $\frac{2}{3}$ of the supply voltage. When the input at pin 1 goes 50 mv below ground, Schmitt trigger 54 is turned off and charge pump 56 is turned off. Capacitor 61 then discharges through resistor 60 to a level approximately $\frac{1}{3}$ the supply voltage. Thus the output signal from the charge pump at pin 3 is a unidirectional voltage varying in amplitude from $\frac{1}{3}$ to $\frac{2}{3}$ times the supply voltage. The electrical "size" or ohmic value of resistor 60 is very important, as it determines the circuit gain. If resistor 60 is made lower in electrical resistance, a higher frequency signal would be necessary at input line 36 to obtain a given current value for the circuit.

At its inverting input, op amp 57 receives a reference voltage from the movable arm of potentiometer 76. Accordingly, the setting of this arm establishes the threshold level for switching op amp 57, and ultimately for locking up the lockup clutch 22. When the ignition switch 26 is closed, a circuit is completed over line 34, resistor 75 and potentiometer 76 to ground. The reference level signal is picked off from the arm and applied to the inverting input of op amp 57. When the signal amplitude at the top of capacitor 61 exceeds this reference level, op amp 57 switches and conducts, gating on transistor 62, which conducts and pulls pin 8 low. Before the time transistor 62 was conducting, diode 64 was reverse biased, and thus the network including this diode, resistor 78 and variable resistor 77 was not effective in the control of op amp 57. However, when transistor 62 is gated on, current flows from the wiper of potentiometer 76 through variable resistor 77, resistor 78, diode 64 and the base-emitter path of transistor 62 to ground. The effect of this flow is to lower the voltage at the wiper arm of potentiometer 76, thus lowering the voltage at the inverting input of op amp 57; this establishes a reduced threshold voltage, and thus provides a certain margin of speed hysteresis in the circuit. This prevents rapid switching of the lockup clutch on and off near the threshold voltage level of op amp 57.

When transistor 62 is gated on and pulls down the voltage level at pin 8, this provides a signal over resistor 63 to the base of transistor 65, turning this transistor on and likewise transistor 66 of the Darlington-connected pair. Current flows over line 31 and winding 32a to energize solenoid valve 32, actuating lockup control valve 24 (FIG. 1) and engaging lockup clutch 22. At the same time current is flowing through winding 32a, current flows through resistor 71, led 72, and diode 73 to ground, illuminating led 72. This provides a visual indication that the lockup has been engaged.

Resistor 67 prevents undesired turn-on of the Darlington pair by multiplication of leakage current in the system. Zener diode 70 protects the circuit components against damage in the event that voltage supplied over ignition switch 26 exceeds the 18 volt level of the Zener diode 70. This could inadvertently occur if a vehicle were "double-jumped" from the battery of another vehicle. Diode 80 also affords important protection for the illustrated circuit, including the Darlington connected pair. If a driver entered the vehicle and actuated the brake circuit, even with the ignition switch open, without diode 80 the circuit point at the top of resistor 75 would be held low through the various accessory loads, while the 12 volts from the battery were applied through diode 81 to the Darlington transistors. This would cause burnout of the Darlington pair.

As the speed of the vehicle gradually decreases, a lowered voltage is developed at pin 4 of the ic and, when this is below the reduced reference voltage appearing at pin 10, op amp 57 is switched off, turning off transistor 62. This causes the voltage at pin 8 to go high, turning off the Darlington transistors 65, 66.

It is important to note that adjustment of the wiper arm of potentiometer 76 provides an easy adjustment for the turn-on point of the lockup clutch. Likewise the effective value of variable resistor 77 is simply adjusted to effect a precise regulation of the clutch release point. If desired, both these controls can be dashboard available adjustments so that the lockup can be set for individual driver preference as well as particular vehicle installation.

In accordance with an important aspect of the invention, actuation of brake switch 28 overrides the operation of the circuit shown in FIG. 2 as a function of a speed-related control signal at pin 1. That is, when brake switch 28 is closed, the 12 volt signal from the battery is immediately applied over conductor 35 and diode 81 to turn off the Darlington pair. This of course deenergizes the solenoid by removing current flow from winding 32a. When the transmission in the vehicle is a CVT type of transmission, it is important to provide as much time as possible for the adjustable pulleys to shift into the underdrive position and avoid any damage to the belt. Use of brake switch control for releasing the clutch assists, because the signal on pin 4 of the ic does not have to decrease to a level below that established at pin 10. Instead the relatively high signal from the car battery 25, diminished only by the voltage drop across diode 81, is immediately available to turn off the Darlington transistors and deenergize the lockup clutch. This is a significant improvement over prior art systems.

Figure 3:
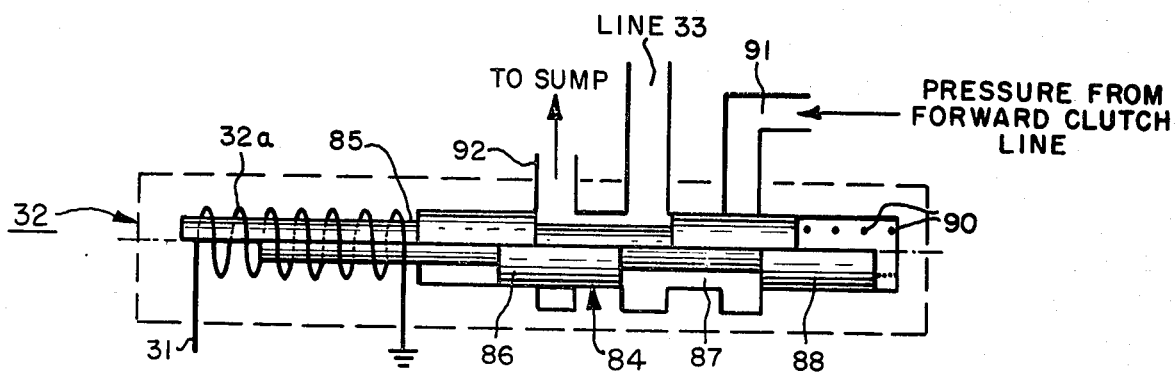
FIGURE 3 is a fluid flow diagram useful in understanding operation of the present invention.

FIG. 3 depicts one arrangement for utilizing a solenoid valve 32 to regulate the pressure signal to the lockup control valve 24. As there shown, the valve 32 includes a spool 84 which has portions, reading from left to right, including a plunger 85 which acts as the armature within winding 32a, a first land 86, an extended groove portion 87, and another land 88. A spring 90 is fitted between the right end of land 88 and the end wall of the valve body. Pressure is supplied through line 91 from the forward clutch line, or any other suitable source of pressure. Channel 92 provides egress for the fluid to the sump of the system, and line 33 is the output fluid signal to the lockup control valve itself.

In the upper portion of FIG. 3, spool 84 is effectively blocking the passage of fluid from line 91 to output line 33, and thus the lockup clutch 22 is deenergized in this condition of the valve 32. For actuation a control signal is provided from control system 30 in FIG. 1, to pass current through winding 32a and displace spool 84 to the right, as shown in the lower portion of FIG. 3. In this position fluid from the forward clutch line passes through the extended groove area 87 and out line 33 to displace lockup control valve 24 into the lockup position, in a manner well-known and understand by those skilled in this art. Many other types of solenoid valves can be utilized, but the one shown in FIG. 3 is a simple arrangement and is readily available to implement the invention according to the description given above.

TECHNICAL ADVANTAGES

The control system of the present invention overcomes the undesirable characteristics of many prior art arrangements, providing more effective control without requiring a signal from the governor valve. Under conditions of torque demand, such as braking or acceleration at low road speeds, torsional vibrations from the engine had been objectionable. Utilizing the control system depicted in FIG. 2 allows the driver to set the engage and disengage points for the lockup clutch even during vehicle operation, very close to the observed points of vibration to avoid such vibration and still obtain the economy of lockup. Use of the brake switch control signal in conjunction with the system of FIG. 2 provides a significant advantage by rapidly dumping the lockup clutch when a panic stop or other rapid braking situation is encountered. This is a substantial advantage not only in CVTs but in conventional gear train transmissions.

In the appended claims, the term "connected" means a d-c connection between two components with virtually zero d-c resistance between those components. The term "coupled" indicates there is a functional relationship between two components, with the possible interposition of other elements between the two components described as "coupled" or "intercoupled".

In the claims, either op amp 57 or the components in ic 50 can be considered as comparison means, for comparing the input signal which varies as vehicle speed with a threshold signal established at pin 10 of the ic. Potentiometer 76 acts as a first adjustable means for establishing a first threshold signal, thus adjusting the point of clutch lockup. Variable resistor 77 functions as a second adjustable means for establishing a second threshold signal, lower than the first, to adjust the point of clutch release and provide a speed hysteresis band. The Darlington-connected pair 65, 66 can be considered as an amplifier stage for controlling the lockup clutch operation in response to an output signal from the comparison means.

The present invention provides an electronic control system particularly useful in a vehicle which has a lockup clutch associated with a hydrodynamic device, whether a fluid coupling or a torque converter. Of particular advantage is a first means, such as potentiometer 76 in the illustrated embodiment, which is easily adjustable to establish a first threshold signal level for determining the point at which the clutch will be engaged. If only a single threshold level is established, normally the vehicle speed would decrease to the same threshold level to effect clutch release. However, in accordance with an important aspect of the invention, an override circuit is provided, such as conductor 35 and a diode 81, to effect clutch release as soon as the brake pedal is depressed, without waiting for the vehicle speed to decrease to the threshold level set by potentiometer 76. In accordance with another important aspect of the invention, a second adjustable means such as variable resistor 77 is provided to establish a second threshold signal level lower than a first signal level already set by potentiometer 76. This ensures that after the clutch is locked up, it will be disengaged at a vehicle speed lower than the lockup level determined by potentiometer 76. This provides a measure of speed hysteresis to prevent chatter or rapid actuation and release of the clutch around the lockup point. In effect the second adjustable means or variable resistor 77 is not in the circuit during lockup. After lockup, and conduction of transistor 62, diode 64 completes the circuit for conduction through resistor 77 and thus places this component in the threshold-determining circuit. Accordingly, diode 64 can be considered as switching means for effectively placing the second adjustable means in the circuit only after the clutch is locked up.

While only a particular embodiment of the invention has been described and claimed herein, it is apparent that various modifications and alterations of the invention may be made. It is therefore the intention in the appended claims to cover all such modifications and alterations as may fall within the spirit and scope of the invention.

What is claimed is:

1. An electronic control system for regulating engagement and release of a lockup clutch for a hydrodynamic device connected in a vehicle drive drain of a vehicle which includes a brake pedal, which control system comprises:
    pickup means for providing an input signal varying as a function of vehicle speed;
    first means for establishing a first threshold signal level, which first means is adjustable to regulate the vehicle speed at which the clutch is locked up;
    comparison means, connected to receive the input and first threshold signals, operable when the input signal exceeds the first threshold signal to provide an output signal;
    actuating means, coupled between the comparison means and the lockup clutch, for engaging the lockup clutch when the output signal is present;
    an override circuit, connected to effect clutch release when the vehicle brake pedal is depressed, without waiting for the vehicle speed to decrease to the threshold signal level set by the first means; and
    second means, coupled to the first means, for establishing a second threshold signal level, lower than the first threshold signal level, after the clutch is locked up so that the clutch is released at a vehicle speed lower than the speed at which the clutch is locked up, which second means is adjustable to regulate the vehicle speed at which the clutch is released.

2. An electronic control system as claimed in claim 1, in which switching means is coupled to the second means for effectively placing the second means in operation only after the clutch is locked up.

3. An electronic control system for regulating engagement and release of a lockup clutch for a hydrodynamic device connected in a vehicle drive train of a vehicle which includes a brake pedal, wherein a control valve is connected to regulate passage of fluid to and from the lockup clutch, which control system comprises:
    pickup means for providing an input signal varying as a function of vehicle speed;
    first adjustable means for establishing a first threshold signal;
    comparison means, connected to receive the first threshold signal and the input signal, and to provide an output signal when the input signal is greater than the first threshold signal;
    an amplifier stage, connected to operate said control valve and lock up the clutch when the output signal is provided by the comparison means;
    an override circuit connected to effect clutch release when the vehicle brake pedal is depressed, without waiting for the vehicle speed to decrease to the threshold signal level set by the first adjustable means; and
    a second adjustable means, coupled to the first adjustable means, for establishing a second threshold signal level, lower than the first threshold signal level, after the clutch is locked up so that the clutch is released at a vehicle speed lower than the speed at which the clutch is locked up.

4. An electronic control system as claimed in claim 3, in which switching means is coupled to the second means for effectively placing the second means in operation only after the clutch is locked up.

5. An electronic control system as claimed in claim 3, in which the control system includes a brake pedal switch connected for actuation in response to brake pedal movement, and an override circuit is coupled between the brake pedal and the amplifier stage, to effect clutch release when the vehicle brake pedal is depressed without waiting for the vehicle speed to decrease to the level set by the second adjustable means.

6. An electronic control system as claimed in claim 3, and the vehicle includes an ignition switch, in which an ignition line is coupled to the comparison means to energize said comparison means when the vehicle ignition switch is closed, and a diode is provided between the ignition line and the amplifier stage, to prevent damage to the amplifier stage by brake switch closure when the ignition switch is open.

7. An electronic control system as claimed in claim 3, in which a Zener diode is coupled across the amplifier stage to protect against component damage when the system is powered from a battery in another vehicle, connected in a sense to add to the battery voltage of the vehicle in which the control system is installed.

8. An electronic control system for regulating engagement and release of a lockup clutch for a hydrodynamic device connected in a vehicle drive train, which vehicle includes an ignition switch, and further includes a brake switch operated by a brake pedal, wherein a lockup control valve is connected to regulate passage of fluid to and from the lockup clutch, which control system comprises:

- pickup means for providing an input signal varying as a function of vehicle speed;
- first adjustable means for establishing a first threshold signal;
- comparison means, connected to receive the first threshold signal and the input signal, and to provide an output signal when the input signal is greater than the first threshold signal;
- means, including the ignition switch, for energizing the comparison means;
- an amplifier stage, connected to operate said control valve and lock up the clutch when the output signal is provided by the comparison means; and
- a second adjustable means, coupled to the first adjustable means, for establishing a second threshold signal level, lower than the first threshold signal level, after the clutch is locked up so that the clutch is released at a vehicle speed lower than the speed at which the clutch is locked up.

9. An electronic control system as claimed in claim 8, in which switching means is coupled to the second adjustable means for effectively placing the second adjustable means in operation only after the clutch is locked up.

10. A control system as claimed in claim 8, and further including a solenoid valve connected to actuate the lockup control valve in response to receipt of the output signal from the comparison means.

11. A control system as claimed in claim 8, in which an override circuit is coupled between the brake switch and the amplifier stage, to effect clutch release when the vehicle brake pedal is depressed without waiting for the vehicle speed to decrease to the level set by the second adjustable means.

12. A control system as claimed in claim 8, in which a diode is provided between the ignition switch and the amplifier stage, to prevent damage to the amplifier stage by brake switch closure when the ignition switch is open.

13. A control system as claimed in claim 8, in which a Zener diode is coupled across the amplifier stage to protect against component damage when the system is powered from a battery in another vehicle, connected in a sense to add to the battery voltage of the vehicle in which the control system is installed.

* * * * *